United States Patent [19]

Cotton

[11] Patent Number: 4,903,175
[45] Date of Patent: Feb. 20, 1990

[54] ILLUMINATION MODULE

[75] Inventor: Greg D. Cotton, Huntington Beach, Calif.

[73] Assignee: McDonnell Douglas Corporation, St. Louis, Mo.

[21] Appl. No.: 278,195

[22] Filed: Nov. 30, 1988

[51] Int. Cl.⁴ .............................................. F21V 11/00
[52] U.S. Cl. ..................................... 362/62; 362/235; 362/237; 362/351
[58] Field of Search ..................... 362/61, 62, 80, 235, 362/236, 237, 332, 351

[56] References Cited

U.S. PATENT DOCUMENTS

| | | | |
|---|---|---|---|
| 2,888,551 | 5/1959 | Nordquist | 362/235 |
| 2,957,073 | 10/1960 | Legge | 362/80 |
| 4,495,549 | 1/1985 | Carlson et al. | 362/62 |
| 4,670,818 | 6/1987 | Moebius | 362/332 |

*Primary Examiner*—Stephen F. Husar
*Assistant Examiner*—Sue Hagarman
*Attorney, Agent, or Firm*—Cohn, Powell & Hind

[57] ABSTRACT

An illumination module comprising a housing having one or more cavities, each containing a source of illumination such as an incandescent lamp at its closed end. A housing mounting plate containing a window coextensive with the open end of the housing is affixed to the open end of said housing in such a way as to create a slot between the mounting plate and the housing. A movable mask containing one or more apertures to configure and position the light as it leaves the housing through the window is located in the slot so that one or more segregated targets can be illuminated by means of the single mask positioning of the apertures relative to the open end of the individual cavities.

18 Claims, 1 Drawing Sheet

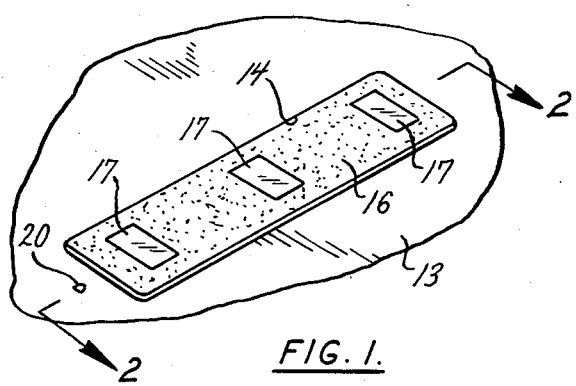
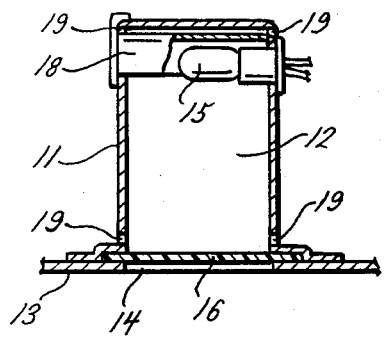
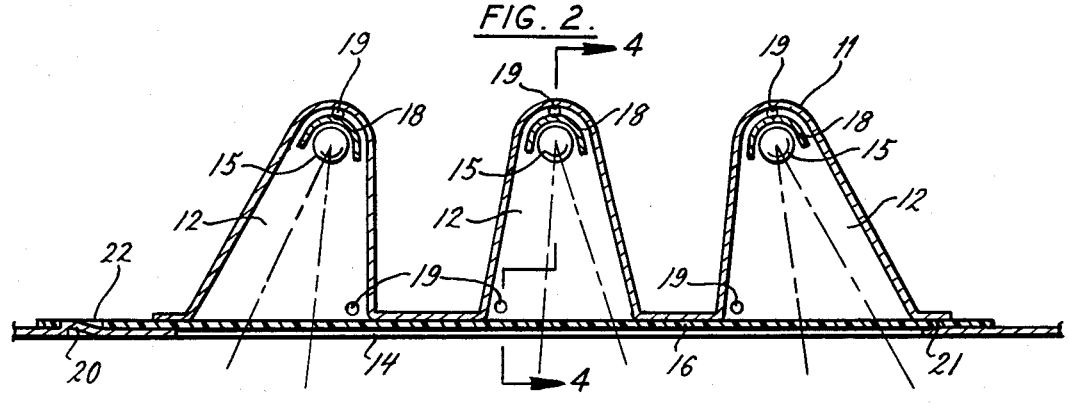
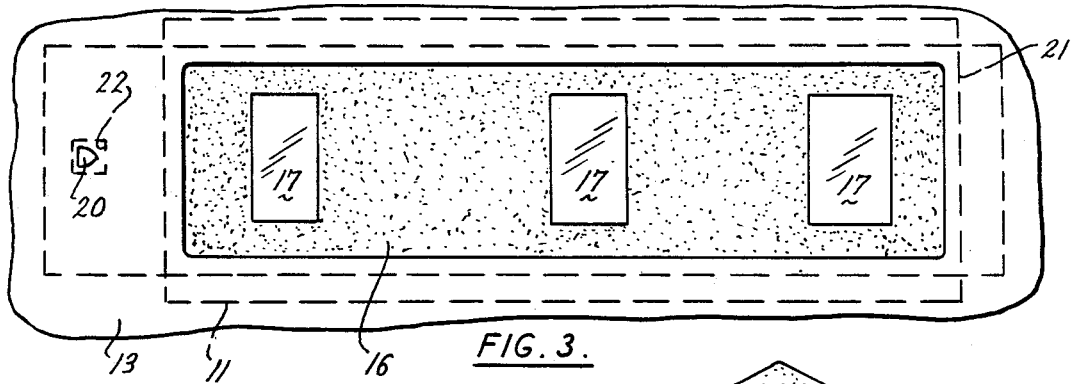
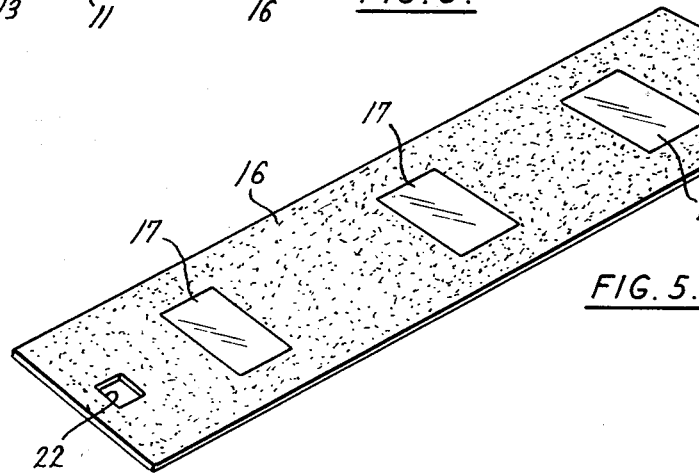

ILLUMINATION MODULE

FIELD OF THE INVENTION

This invention relates in general to an illumination module, and more particularly to a module providing for single point adjustment of segregated illumination targets.

BACKGROUND OF THE INVENTION

The illumination module of this invention is described in connection with its use as a passenger reading light on an aircraft or other transportation vehicle. The module can also be used in store displays or theater lighting situations where direct and easy access to the illumination sources for a multitude of targets is not convenient, or is difficult, dangerous, or time-consuming. In the case of the airline application, the passenger service unit (PSU) providing convenience servies for each row of passengers contains, among other things, a reading light for each seat location. These units present several problems. First, each reading light must be manually positioned individually. Passengers often are not sure which light to adjust or how to adjust it, or can't conveniently or safely reach it. Cabin attendants must, on occasion, be called to make the adjustments or give instructions. Second, each light source illuminates the target seat and additionally spills over to adjacent seats often to the discomfort of that seat's occupant. Finally, the mechanisms for directing the illumination of PSUs currently in use are based on a ball and socket concept which may be more mechanically complicated to manufacture, use, maintain, and repair than the present invention.

The present invention is a module containing multiple illumination sources in separate cavities or compartments. llumination exiting the module from each cavity passes through a specifically configured aperture in a mask positioned in a slot between the open end of the module housing and a window in the housing mounting plate attached to the open end of the housing. Thus, the module, configured for a particular row seating arrangement in a specific airliner, may be mounted above the row. The mask with an appropriate number of pre-configured apertures can be inserted and set within the housing slot so that each aperture permits illumination leaving the module to be appropriately configured, directed, positioned, and confined at each individual passenger location.

SUMMARY OF THE INVENTION

Accordingly, it is an object of the present invention to provide multiple illumination patterns from a single illumination module.

Another object of the invention is to provide separately configured illumination patterns from a single illumination module.

Yet another object of the invention is to provide targeted illumination patterns from a single illumination module.

Still another object of the invention is to provide segregated illumination patterns from a single illumination module.

An additional object of the present invention is to provide illumination of a target area with little or no illumination spillover to adjacent areas.

And yet another object of the invention is to provide a means of pre-setting multiple illumination patterns for variable but known seating configurations in transportation vehicles.

Other features and a fuller understanding of the invention may be had by referring to the following description and claims, taken in conjunction with the accompanying drawings in which:

DESCRIPTION OF THE DRAWINGS

FIG. 1 is a perspective view looking up at the installed invention.

FIG. 2 is a sectional view of the invention taken along 2—2 in FIG. 1.

FIG. 3 is a bottom view of the invention as shown in FIG. 2.

FIG. 4 is a sectional view of the invention taken along 4—4 of FIG. 2.

FIG. 5 is a perspective view of the mask of the invention.

DETAILED DESCRIPTION

With reference to the drawings, the invention comprises, in general, a housing 11 containing one or more cavities 12 and having a closed end and an open end. As shown in FIGS. 2 and 4, housing 11 contains an illumination source 15 at its closed end and a housing mounting plate 13, as shown in FIGS. 3 and 4, affixed to the open end of and at a small distance from said housing to create slot 21, shown in FIGS. 2 and 3. Window 14, an integral part of housing mounting plate 13 is located coextensive with the open end of the housing. The housing mounting plate 13 can be formed as an integral part of the housing 11, if desired. Slot 21 can be fabricated in the unitary assembly 11, 13, as shown.

Referring to FIGS. 2 and 4, illumination source 15 is typically an incandescent or other type of lamp that generates some degree of heat in operation. Thus, housing 11 has vents 19 located at appropriate points to enhance heat discharge. Reflector 18 is located between the closed end of housing 11 and illumination source 15 to direct illumination toward the open end of said housing. Reflector 18 is positioned about illumination source 15 so that it directs illumination in the desired direction through the open end of housing 11.

A mask 16 containing at least one aperture 17 is inserted in slot 21 and affixed therein by means of dimple 20 raised upward from housing mounting plate 13 in the direction of the closed end of housing 11, engaging mask key-hole 22. By appropriate configuration and placement of aperture 17 in mask 16 relative to the open end of housing 11, the configuration and direction of the illumination passing through window 14 on the way to its target can be preset. A portion of mask 16 visible through window 14 can be seen in FIG. 3 when viewing the invention in a typical installation from below.

In the preferred mode of the present invention, as depicted in FIG. 2, housing 11 is comprised of a plurality of cavities 12, each of which contains an illumination source 15 backed by a reflector 18 and containing an appropriate number of vents 19 for heat elimination. Window 14 may be an uncovered or covered opening in mounting plate 13. A transparent pane or lens, not shown, may be used for covering window 14, to protect the light source 15 or to focus the light passing through window 14, if desired.

Mask 16, as shown in FIG. 5, contains a plurality of apertures 17, each of which is configured and positioned in said mask so that when it is placed in slot 21, and secured by dimple 20 engaging key-hole 22, each aperture 17 controls the pattern and target coverage of illumination exiting from the individual cavity 12 with which it is associated. Thus, for example, where the targets are the individual seats in a row on an air-liner of a particular model and seating configuration, a single preconfigured mask 16 in a single housing 11 with the number of light apertures 17 and corresponding cavities 12 equalling the number of seats in the row would be used. Housing 11 can be fabricated or molded in one piece with material selection dependent on application environment. Likewise, mask 16 can be prepared using a flexible film material like MYLAR TM film. Apertures for communicating light out of housing 11 may be openings of the desired configuration and location cut out of mask 16 or they may be transparent areas photochemically created in a photosensitive mask material.

Although the present invention has been described with a degree of particularity, it is understood that the present disclosure has been made only by way of example and that changes in the details of construction and the combination and arrangement of parts may be resorted to without departing from the spirit and scope of the invention as hereinafter claimed.

I claim as my invention:

1. An illumination module, comprising,
   (a) a housing having an opening at one end,
   (b) the housing having a housing mounting plate across the opening and spaced therefrom creating a slot in the housing adjacent to the housing mounting plate, the housing mounting plate having a window coextensive with the open end of said housing, the housing having means for inserting a mask in the as formed slot,
   (c) an illumination source at the closed end of said housing,
   (d) an insertable mask located within said slot, the mask having aperture means for configuring and positioning illumination from said source passing through the aperture means to a target area in the external environment.

2. The illumination module of claim 1 wherein said housing consists of a plurality of cavities, each having a separate illumination source.

3. The illumination module of claim 1 wherein said mask is movably located in said slot.

4. The illumination module of claim 1 wherein said mask has a key-hole at one end and said housing mounting plate has a raised dimple at one end in the direction of said mask to engage the keyhole therein, thus holding said mask immobile within the module.

5. The illumination module of claim 1 wherein said mask is a removably insertable opaque strip having a plurality of aperture means located in said strip for controlling the pattern and positioning the illumination on a plurality of target areas external to the housing.

6. The illumination module of claim 1 wherein a reflector is affixed at th closed end of said housing between said closed end and said illumination source to maximize the illumination exiting the housing through the aperture in the mask.

7. The illumination module of claim 1 wherein said illumination source is an incandescent light bulb.

8. The illumination module of claim 1 wherein the window in said mounting plate contains a means for concentrating the illumination passing through said window.

9. The illumination module of claim 1 wherein the window in said mounting plate contains a lens for concentrating the illumination passing through said window.

10. The illumination module of claim 1 wherein the mask is insertable above the housing mounting plate.

11. The illumination module of claim 1 wherein the housing mounting plate is integrally formed with the illumination module.

12. The illumination module of claim 1 wherein the mask is a flexible film.

13. The illumination module of claim 1 wherein the mask is inserted into the illumination module above the housing mounting plate.

14. The illumination module of claim 13 wherein the mask has a plurality of apertures.

15. An illumination module having means for providing segregated and targeted illumination with little or no spillover between adjacent target areas, comprising a housing having an opening at one end, a housing mounting plate having a window coextensive with the open end of said housing, said housing mounting plate being affixed across and spaced from said opening, creating an integrally formed slot between said mounting plate and said housing, an illumination source at the closed end of said housing, a mask having aperture means located within said slot for segregating, configuring and positioning illumination from said source passing through the aperture means to a plurality of target areas in the external environment with little or no spillover between adjacent target areas.

16. The illumination module of claim 15 wherein the housing has means for releasably retaining the mask in the slot.

17. The illumination module of claim 15 wherein the mask is movably and removably located in said slot.

18. The illumination module of claim 15 wherein the mask is removably insertable above the housing mounting plate.

* * * * *

UNITED STATES PATENT AND TRADEMARK OFFICE
CERTIFICATE OF CORRECTION

PATENT NO. : 4,903,175

DATED : 20 February 1990

INVENTOR(S) : Greg D. Cotton

It is certified that error appears in the above-identified patent and that said Letters Patent is hereby corrected as shown below:

In column 4, line 4, the word [th] should be the.

Signed and Sealed this

Twenty-fifth Day of June, 1991

Attest:

HARRY F. MANBECK, JR.

*Attesting Officer*     *Commissioner of Patents and Trademarks*